US012215792B2

(12) United States Patent
Darby (10) Patent No.: US 12,215,792 B2
(45) Date of Patent: Feb. 4, 2025

(54) VALVE ASSEMBLY (71) Applicant: LIQUI-BOX CORPORATION, Richmond, VA (US)

(72) Inventor: Ian Darby, Leicestershire (GB)

(73) Assignee: LIQUI-BOX CORPORATION, Richmond, VA (US)

( * ) Notice: Subject to any disclaimer, the term of this patent is extended or adjusted under 35 U.S.C. 154(b) by 0 days.

(21) Appl. No.: 18/562,421

(22) PCT Filed: Jun. 21, 2022

(86) PCT No.: PCT/GB2022/051573
§ 371 (c)(1),
(2) Date: Nov. 20, 2023

(87) PCT Pub. No.: WO2022/269244
PCT Pub. Date: Dec. 29, 2022

(65) Prior Publication Data
US 2024/0318730 A1    Sep. 26, 2024

(30) Foreign Application Priority Data
Jun. 22, 2021    (EP) .................................... 21180901

(51) Int. Cl.
*F16K 1/44*    (2006.01)
*F16K 1/46*    (2006.01)
*F16K 15/06*    (2006.01)

(52) U.S. Cl.
CPC ............... *F16K 1/443* (2013.01); *F16K 1/46* (2013.01); *F16K 15/063* (2013.01)

(58) Field of Classification Search
CPC ...... F16K 1/443; F16K 15/028; F16K 15/064; F16K 15/184; F16K 15/1402;
(Continued)

(56) References Cited

U.S. PATENT DOCUMENTS 2,888,034 A * 5/1959 Glegg ................. F04B 53/1092
                                                    251/902
5,072,756 A * 12/1991 Carr ........................ F16L 29/04
                                                    137/614.04
(Continued)

FOREIGN PATENT DOCUMENTS

CN    1077654    10/1993
CN    1187595    7/1998
(Continued)

OTHER PUBLICATIONS

Machine English Translation of DE102005002471A1 (Year: 2024).*
(Continued)

*Primary Examiner* — Hailey K. Do
(74) *Attorney, Agent, or Firm* — Jon M. Isaacson (57) ABSTRACT A valve assembly (300) comprising a valve body (302) and a mono-material plunger (304). The valve body (302 has a primary opening (314) and a secondary opening (315) that are axially spaced apart. The plunger (304) comprises a primary seal 5 portion (316) and a secondary seal portion (317). The plunger (304) comprises the following operational positions with respect to the valve body: a transit seal position in which the primary seal portion (316) of the plunger (304) is in contact with the valve body (302) in order to occlude the primary opening (314); and a fluid flow position in which the plunger (304) is maintained in the fluid flow position by an external force 10 and a force caused by a pressure differential across the valve assembly (300).

15 Claims, 5 Drawing Sheets

(58) Field of Classification Search
CPC ......... F16K 2200/201; F16K 2200/204; F16K 2200/301; F16K 2200/305; B67D 1/0462; B67D 3/043; B65D 47/248; B65D 77/067
See application file for complete search history.

(56) References Cited

U.S. PATENT DOCUMENTS

| | | |
|---|---|---|
| 2002/0055816 A1 | 5/2002 | H. Chamas et al. |
| 2003/0230596 A1 | 12/2003 | Masuda |
| 2012/0111901 A1 | 5/2012 | Beard |
| 2013/0192691 A1 | 8/2013 | Smith et al. |
| 2013/0306676 A1 | 11/2013 | Fishel |
| 2015/0001261 A1 | 1/2015 | Johnson |

FOREIGN PATENT DOCUMENTS

| | | | |
|---|---|---|---|
| CN | 1747879 | 3/2006 | |
| CN | 107585428 | 1/2018 | |
| DE | 29822543 U1 * | 4/1999 | ......... B65D 47/2075 |
| DE | 102005002471 A1 * | 7/2006 | ........... B65D 47/248 |
| DE | 202010002240 | 5/2010 | |
| DE | 102009017031 | 10/2010 | |
| DE | 102009040832 | 3/2011 | |
| DE | 102015003506 | 9/2016 | |
| DE | 102015010477 | 2/2017 | |
| DE | 102015013425 | 4/2017 | |
| DE | 102019209632 A1 * | 1/2021 | |
| EP | 0150144 A2 * | 7/1985 | |
| GB | 1 127 567 | 9/1968 | |
| GB | 2 579 628 | 7/2020 | |
| WO | 2012/152246 | 11/2012 | |
| WO | 2020115699 | 6/2020 | |

OTHER PUBLICATIONS

Machine English Translation of DE102019209632A1 (Year: 2024).*
Machine English Translation of DE29822543U1 (Year: 2024).*
International Search Report and Written Opinion corresponding to International Patent Application No. PCT/GB2022/051573, mailed Aug. 19, 2022.
European Patent Office, Communication with extended European Search Report in Application No. 21180901.7, dated Dec. 17, 2021 (6 pages).

* cited by examiner

VALVE ASSEMBLY

RELATED APPLICATIONS

This application is a national phase entry of PCT/GB2022/051573, filed Jun. 21, 2022, the complete subject matter and contents of which is incorporated herein by reference in its entirety.

The present disclosure relates to a valve assembly, and in particular to a valve assembly that has a movable plunger that can open and close the valve assembly for fluid flow.

Liquids, such as beverages, can be provided in bags that have a valve assembly built into them. When it is required to dispense the liquid from the bag, a lineside connector can be connected to the valve assembly such that liquid can flow out of the bag.

According to a first aspect of the present disclosure there is provided a valve assembly comprising a valve body and a mono-material plunger, wherein:
  the valve body has a primary opening and a secondary opening, wherein the primary opening and the secondary opening are axially spaced apart;
  the plunger comprises:
    a primary seal portion configured to selectively occlude the primary opening; and
    a secondary seal portion configured to selectively occlude the secondary opening; and
  wherein the plunger comprises the following operational positions with respect to the valve body:
  a transit seal position in which:
    the primary seal portion of the plunger is in contact with the valve body in order to occlude the primary opening; and
  a fluid flow position in which:
    the primary seal portion of the plunger is spaced apart from the valve body such that fluid can flow through the primary opening;
    the secondary seal portion of the plunger is spaced apart from the valve body such that fluid can flow through the secondary opening; and
    the plunger is maintained in the fluid flow position by an external force and a force caused by a pressure differential across the valve assembly.

Advantageously, having such a mono-material plunger can significantly increase the ease with which the valve assembly can be recycled. Further still, the plunger can be made from the same material as a bag to which it is attached. This further increases the recyclability because the valve assembly and the bag can be conveniently recycled together When the plunger is in the transit seal position: the plunger may be mechanically retained in the transit position such that a spring portion of the plunger is relatively uncompressed.

When the plunger is in the transit seal position: the secondary seal portion of the plunger may be in contact with the valve body in order to occlude the secondary opening.

The plunger may comprise the following further operational position with respect to the valve body:
  a lineside-attached position in which:
    the primary seal portion of the plunger is spaced apart from the valve body such that fluid can flow through the primary opening;
    the secondary seal portion of the plunger is in contact with the valve body in order to occlude the secondary opening; and
    the plunger is maintained in the lineside-attached position by an external force.

The plunger may be maintained in the lineside-attached position by the external force that is applied against an axial spring bias force.

The plunger may comprise a spring portion that is configured to provide the axial spring bias force.

The plunger may comprise the following further operational position with respect to the valve body:
  a disconnected position in which:
    the secondary seal portion of the plunger is in contact with the valve body in order to occlude the secondary opening; and
    the plunger is retained in the disconnected position by a spring portion of the plunger.

The plunger may be configured to be in the disconnected position following removal of the external force.

When the plunger is in the disconnected position: the primary seal portion of the plunger may be in contact with the valve body in order to occlude the primary opening.

The valve body may have a distal end and a proximal end. The primary opening may be closer to the distal end of the valve body than the secondary opening.

In the fluid flow position:
  the primary seal portion of the plunger may be maintained spaced apart from the valve body by the external force; and
  the secondary seal portion of the plunger may be maintained spaced apart from the valve body by the pressure differential across the valve assembly.

In the fluid flow position: the primary seal portion of the plunger may be maintained spaced apart from the valve body by the external force that is applied against an axial spring bias force.

The plunger may comprise a spring portion that is configured to provide the axial spring bias force.

In the fluid flow position: the secondary seal portion of the plunger may be maintained spaced apart from the valve body by the pressure differential across the valve assembly and also against the axial spring bias force.

There is also provided a drinks container comprising any valve assembly disclosed herein.

Embodiments of the present disclosure will now be described by way of example and with reference to the accompanying drawings, in which.

Figure 1A:
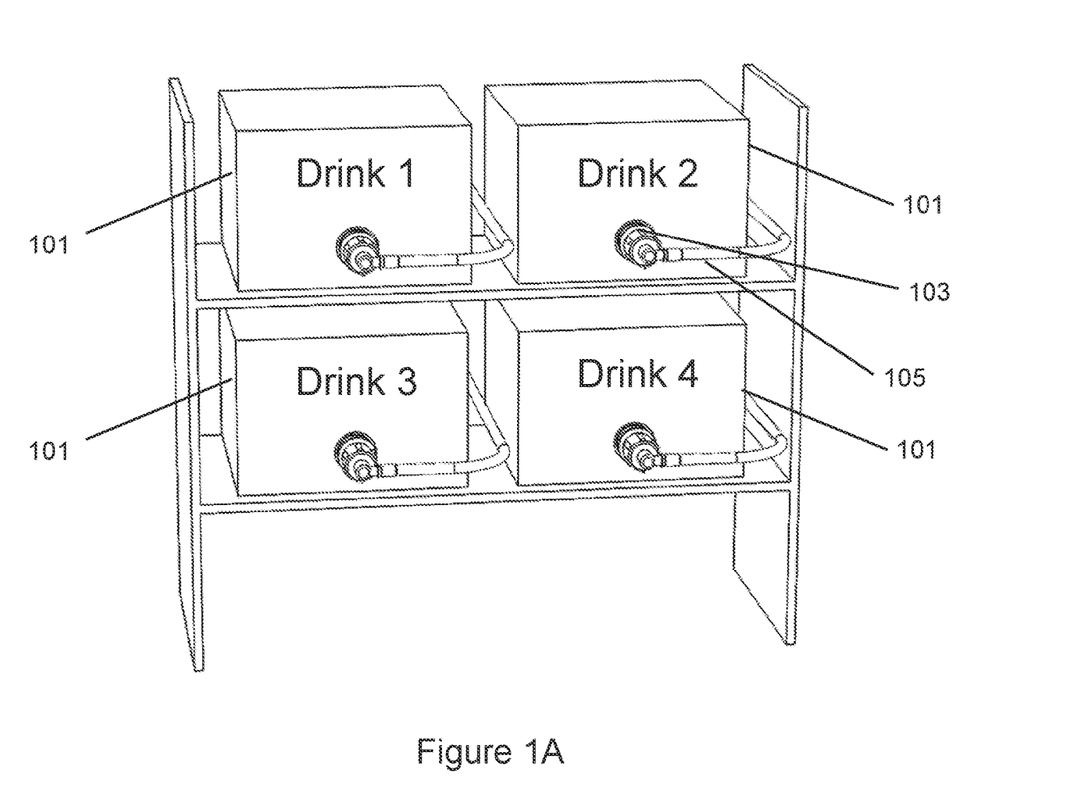
FIG. 1a shows a rack of four boxes which each have a drinks container inside.

FIG. 1a shows a rack of four boxes 101 which each have a drinks container inside that contains a liquid beverage. The drinks container in this example is a flexible bag. Each bag has a valve assembly, which is exposed through the box 101 so that it can be connected to a lineside connector 103 and pipework 105 for transporting the beverage from inside the bag to a point where it can be dispensed through a tap.

Figure 1B:
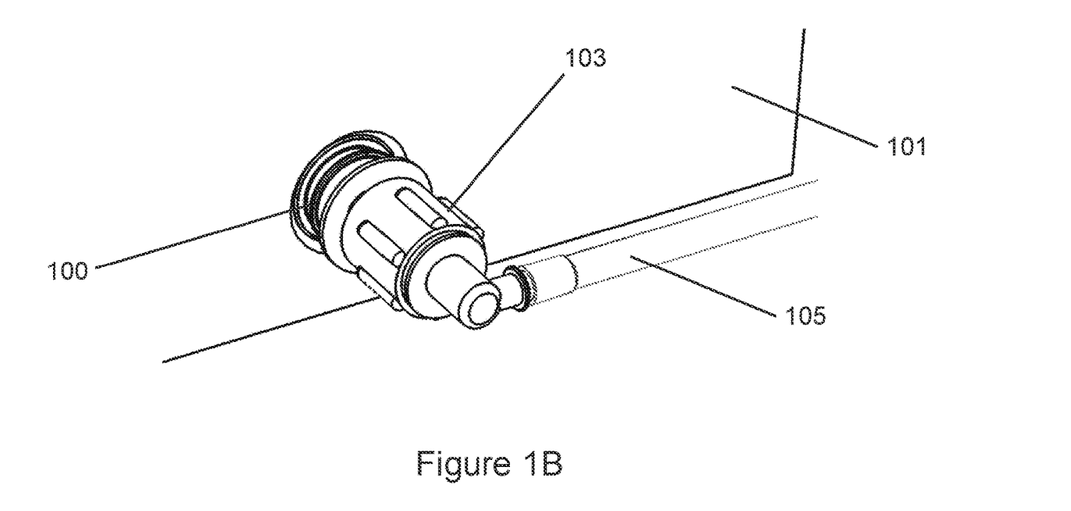
FIG. 1b shows a close-up view of the part of a box to which a lineside connector is connected.

FIG. 1*b* shows a close-up view of the part of a box 101 to which a lineside connector 103 is connected. Also visible in FIG. 1*b* is part of the valve assembly 100, which will be described in detail below. In this example, the lineside connector 103 is screwed on to the valve assembly 100. The action of screwing on the lineside connector 103 can in some examples open both the valve assembly 100 (which can also be considered as a bag valve) and a lineside valve within the lineside connector 103. In some examples a pressure differential can be applied across the valve assembly 100 (by creating a vacuum in the pipework 105) in order to open the valve assembly such that liquid can flow out of the bag in the box 101. When the lineside connector 103 is unscrewed from the valve assembly 100 and/or when the pressure differential is removed, the lineside valve closes and the valve assembly 100 also closes prior to the lineside connector 103 being fully disconnected from the valve assembly 100.

Figure 2:
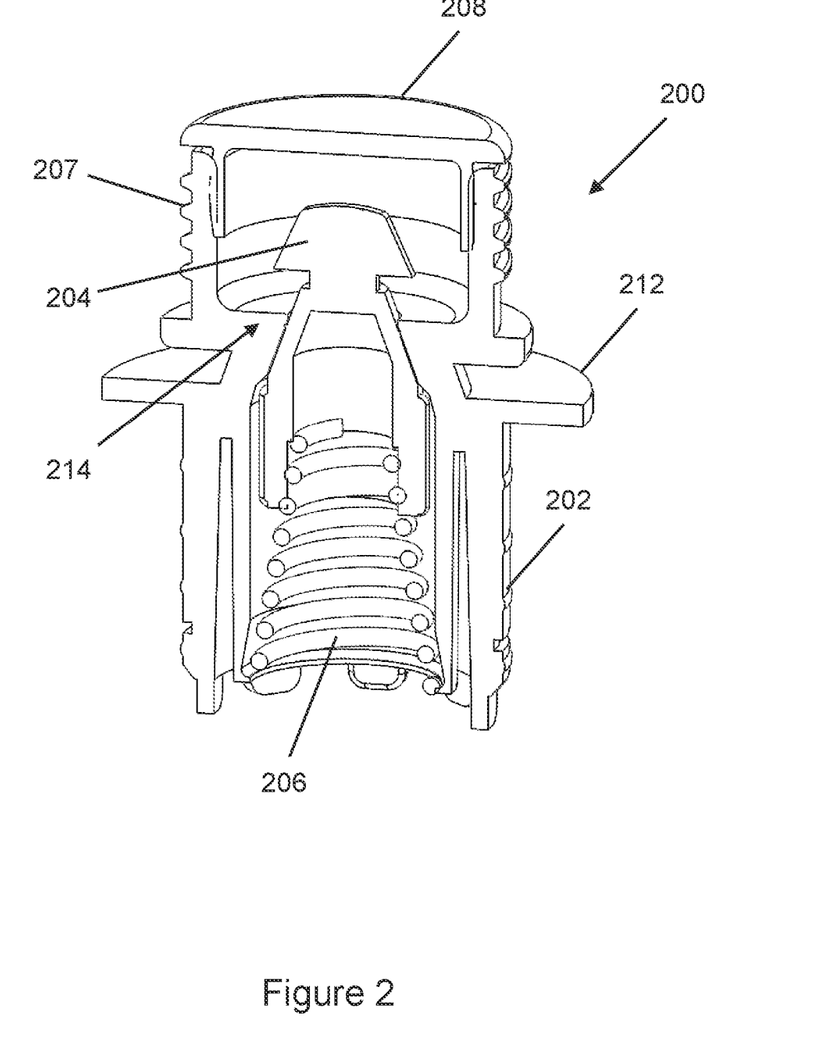
FIG. 2 shows a cross-sectional view through a valve assembly that includes an axial spring.

FIG. 2 shows a cross-sectional view through a valve assembly 200 that includes an axial spring 206 for providing an axial bias force for biasing the valve assembly 200 to a closed position. The axial direction of the valve assembly 200 as it is shown in FIG. 1 is a vertical direction.

The valve assembly 200 includes a valve body 202. The valve body 202 has a radially extending lip 212. When the valve assembly 200 is fitted to a bag or other container (not shown in FIG. 2), the radially extending lip 212 can be located on the outer surface of the bag such that the portion of the valve assembly that is above the lip 212 (as it is shown in FIG. 2) is outside the bag, and the portion of the valve assembly that is below the lip 212 (as it is shown in FIG. 2) is inside the bag.

The valve assembly 200 of FIG. 2 is shown with a protective cap 208 fitted thereon. Such a cap 208 can be connected to the valve assembly 200 when it is in transit to prevent the valve assembly 200 from inadvertently being opened and to keep the portion of the valve assembly 200 that is outside the bag clean. When the cap 208 is removed, a distal portion of a plunger 204 is exposed. As discussed above, a lineside connector (not shown) can be connected to the valve assembly 200 to open the valve assembly 200. In this example the valve body 202 includes a threaded portion 207 so that the lineside connector (not shown) can be screwed onto the valve assembly 200. As will be appreciated from the description that follows, the lineside connector is shaped such that it will apply an external force to the plunger 204 as it is attached to the valve assembly 200 in order to open the valve assembly 200.

The valve body 202 has an opening 214 through which the plunger 204 extends. The plunger 204 is axially movable relative to the valve body 202 between an open position and a closed position. In FIG. 2 the plunger 204 is shown in the closed position, in that it provides a seal with the valve body 202 such that the opening 214 of the valve body is occluded and liquid cannot flow through the valve assembly 200. The plunger 204 is biased to the closed position by the axial spring 206, which applies a force (in the upwards direction in FIG. 2) to the plunger 204.

When it is desired to open the valve assembly 200, an external axial force is applied to the plunger 204 (in the downwards direction in FIG. 2) by the lineside connector. When the external force overcomes the bias force that is applied by the axial spring 206, the plunger 204 moves from the closed position to the open position such that the plunger 204 no longer provides a seal with the valve body 202 and liquid can flow through the opening 214 in the valve body 202. In this way, liquid can flow from the bag or other container, through the valve assembly 200, and out of the lineside connector when the valve assembly 200 is open. This direction of liquid flow is upwards in FIG. 2, although it will be appreciated that, in use, the valve assembly is likely to have a different orientation such that gravity can assist with causing the liquid to flow though the valve assembly 200.

Figure 3A:
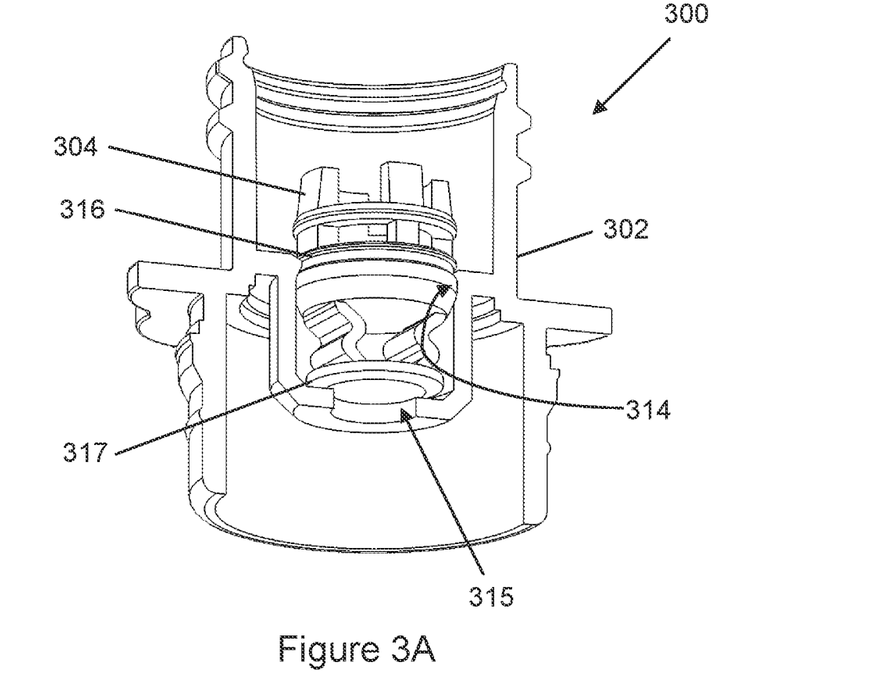
FIG. 3a shows a partially cross-sectional view through an improved valve assembly in a transit seal position.
Figure 3B:
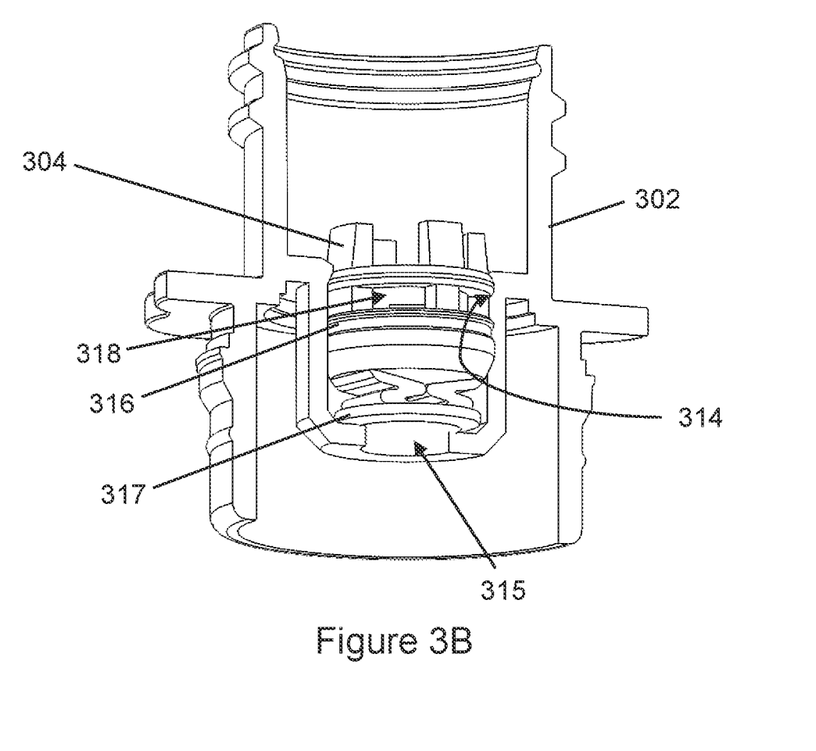
FIG. 3b shows a partially cross-sectional view through the improved valve assembly in a fluid flow position.

FIG. 3*a* shows a partially cross-sectional view through an improved valve assembly 300 in a transit seal position. FIG. 3*b* shows a partially cross-sectional view through the improved valve assembly 300 in a fluid flow position.

The valve assembly 300 includes a valve body 302 and a plunger 304. In FIGS. 3*a* and 3*b* the valve body 302 is shown in cross-section, but the plunger 304 is not.

Advantageously the plunger 304 is made from a single material; that is, it is a mono-material plunger 304. Having such a mono-material plunger 304 can significantly increase the ease with which the valve assembly 300 can be recycled. Further still, the plunger 304 can be made from the same material as the bag to which it is attached. This further increases the recyclability because the valve assembly 300 and the bag can be conveniently recycled together. For instance, the plunger 304 can be formed from polyolefin (in some examples polyethylene) as a single unitary piece.

The plunger 304 and the valve body 302 can be considered as having: a distal end (the upper end in FIGS. 3*a* and 3*b*) that is distal from a liquid supply that will be connected to the valve assembly 300; and a proximal end (the lower end in FIGS. 3*a* and 3*b*) that is proximal to the liquid supply. The valve assembly 300 provides the functionality of a one-way valve, such that liquid can flow through the valve assembly 300 from the proximal end to the distal end of the valve assembly 300 (but not in the reverse direction), which has significant advantages from a microbiological point of view. This is because the valve assembly 300 prevents liquid from flowing back into the bag from the (potentially relatively dirty) pipework that is attached to the valve assembly 300.

The valve body 302 has a primary opening 314 and a secondary opening 315. The primary opening 314 and the secondary opening 315 are axially spaced apart such that when fluid flows through the valve assembly 300 it flows through the secondary opening 315 and the primary opening 314 in turn. In this example, the primary opening 314 is closer to the distal end of the valve body 302 than the secondary opening 315. Although in other examples the primary opening 314 can be closer to the proximal end of the valve body 302 than the secondary opening 315.

The plunger 304 includes a primary seal portion 316 and a secondary seal portion 317. The primary seal portion 316 is configured to selectively occlude the primary opening 314, and the secondary seal portion 317 is configured to selectively occlude the secondary opening 315. In the transit seal position, as shown in FIG. 3*a*, the primary seal portion 316 of the plunger 304 is in contact with the valve body 302 in order to occlude the primary opening 314. In this example, in the transit seal position the secondary seal portion 317 of the plunger 304 is also in contact with the valve body 302 in order to occlude the secondary opening 315. Although, as will be discussed below, it is not essential for the secondary opening 315 to be occluded in the transit seal position because the valve assembly 300 is closed by the primary seal portion 316.

In the fluid flow position, as shown in FIG. 3b, the primary seal portion 316 of the plunger 304 is spaced apart from the valve body 302 such that fluid can flow through the primary opening 314. FIG. 3b shows how the primary seal portion 316 has moved downwards, and away from the region of the valve body 302 that it was in contact with in the transit seal position (as shown in FIG. 3a), such that there is a liquid flow path through the primary opening 314 and through apertures 318 in the plunger 304. This movement of the primary seal portion 316 of the plunger 304 relative to the valve body 302 is caused by an external force that is applied to the plunger 304. As will described with reference to FIGS. 4a to 4e, connecting the lineside connector to the valve assembly 300 can provide the external force that opens the flow path through the primary opening 314.

Also in the fluid flow position of FIG. 3b, the secondary seal portion 317 of the plunger 304 is spaced apart from the valve body 302 such that fluid can flow through the secondary opening 315 (although the perspective in FIG. 3b makes this difficult to see). In this example, a pressure differential is applied across the valve assembly 300 by reducing the pressure in the pipework that is connected to the lineside of the valve assembly 300 (the upper end of the valve assembly 300 in FIGS. 3a and 3b). This pressure differential results in a force on the secondary seal portion 317 that is sufficient to move it upwards and away from the region of the valve body 302 that it was in contact with in the transit seal position (as shown in FIG. 3a), such that there is a liquid flow path through the secondary opening 315. This liquid flow path is around the outside of the second seal portion 317 in FIG. 3b.

In this way, in the fluid flow position: the primary seal portion 316 of the plunger 304 is maintained spaced apart from the valve body 302 by the external force; and the secondary seal portion 317 of the plunger 304 is maintained spaced apart from the valve body 302 by the pressure differential across the valve assembly 300. Furthermore, in this example the primary seal portion 316 is maintained spaced apart from the valve body 302 by the external force that is applied against an axial spring bias force, and the secondary seal portion 317 is maintained spaced apart from the valve body 302 by the pressure differential across the valve assembly 300 and also against the axial spring bias force. Further details will be provided below.

FIGS. 4a to 4e will now be used to describe the operation of the valve assembly of FIGS. 3a and 3b in more detail, and more particularly various operational positions of the plunger 404 with respect to the valve body 402. Features of FIGS. 4a-4e that are also illustrated in FIG. 3a or 3b will be given corresponding reference numbers in the 400 series.

Figure 4A:
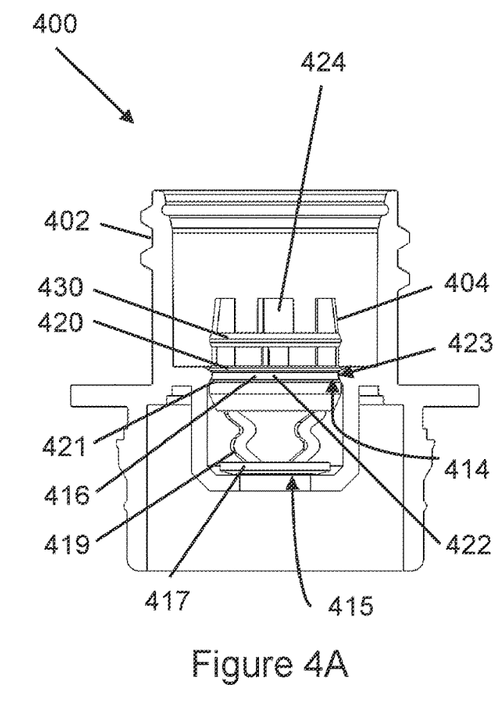
FIG. 4a illustrates the valve assembly of FIGS. 3a and 3b with the plunger in a transit seal position.
Figure 4B:
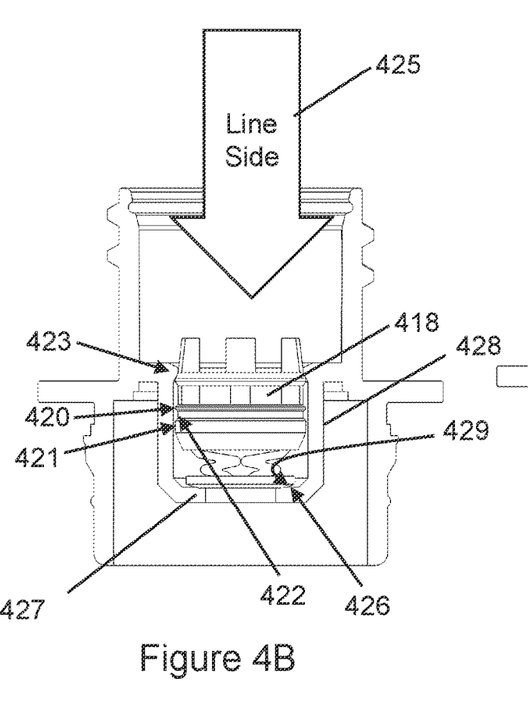
FIG. 4b illustrates the valve assembly of FIGS. 3a and 3b with the plunger in a lineside-attached position.
Figure 4C:
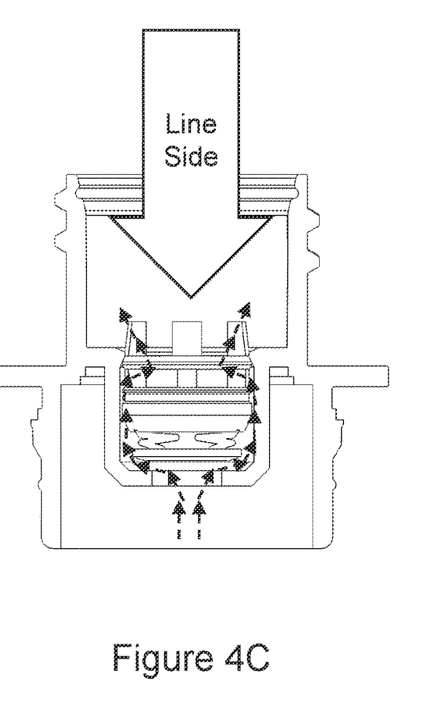
FIG. 4c illustrates the valve assembly of FIGS. 3a and 3b with the plunger in a fluid flow position.
Figure 4D:
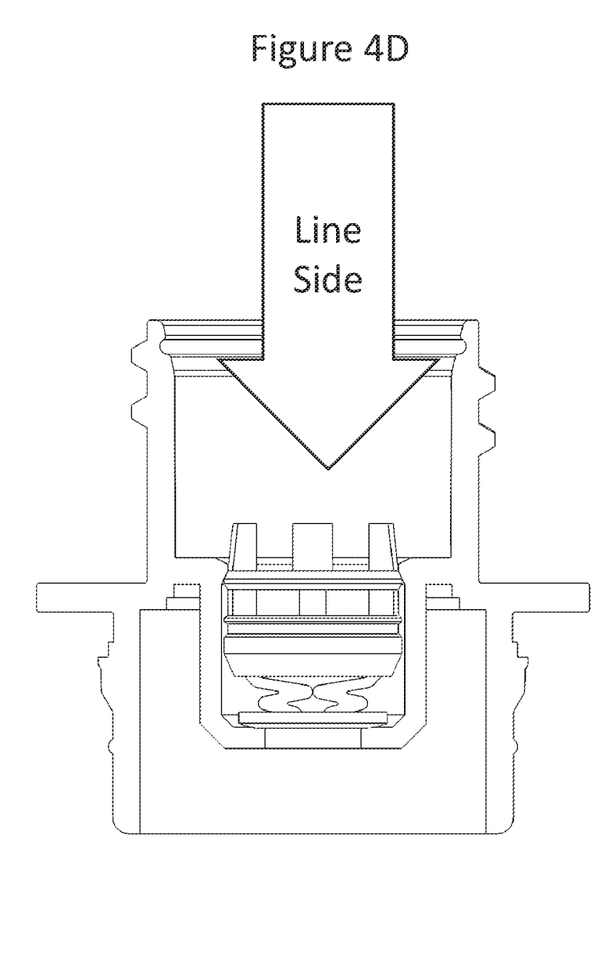
FIG. 4d illustrates the valve assembly of FIGS. 3a and 3b with the plunger in a reseal position.
Figure 4E:
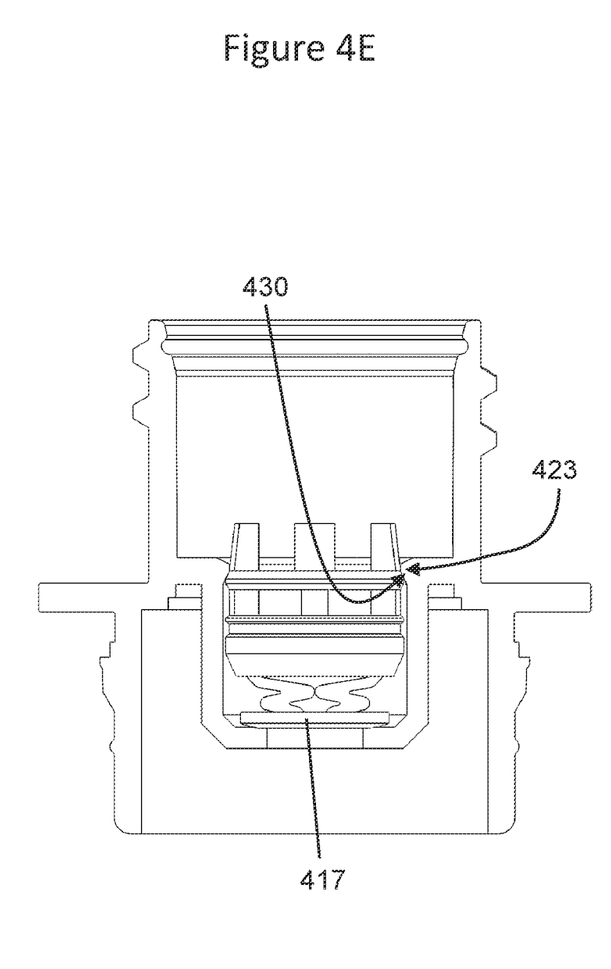
FIG. 4e illustrates the valve assembly of FIGS. 3a and 3b with the plunger in a disconnected position.

FIG. 4a illustrates the plunger 404 in the transit seal position. FIG. 4b illustrates the plunger 404 in a lineside-attached position. FIG. 4c illustrates the plunger 404 in the fluid flow position. FIG. 4d illustrates the plunger 404 in a reseal position, which in this example is the same as the lineside-attached position. FIG. 4e illustrates the plunger 404 in a disconnected position.

The plunger 404 includes an actuation portion 424, a primary seal portion 416, a spring portion 419, and a secondary seal portion 417. Further details of how these portions function in operation of the valve assembly 400 will be described below.

With reference to FIG. 4a, the plunger 404 is in the transit seal position such that the valve assembly 400 (and the bag of fluid to which it is attached) is suitable for transit. When the bag of fluid is in transit the valve assembly 400 is closed because access to the fluid in the bag will not be required.

In the same way as described above, the primary seal portion 416 of the plunger 404 is in contact with the valve body 402 in order to occlude the primary opening 414. In this example the plunger 404 is mechanically retained in the transit seal position such that an axial bias spring (in this example provided by the spring portion 419 of the plunger 404) is relatively uncompressed. Advantageously this can extend the lifetime of the valve assembly 400 because the plunger 404 is not under stress when the valve assembly 400 is in transit and is not required to be opened.

The mechanical retention is provided by a proximal transit seal lip 421 and a distal transit seal lip 420 of the plunger 404. In between the proximal transit seal lip 421 and the distal transit seal lip 420, in an axial direction, is a transit sealing region 422. (These lips 420, 421 and the transit sealing region 422 are labelled in FIGS. 4a and 4b, and can be considered part of the primary seal portion 416.) The proximal transit seal lip 421 and the distal transit seal lip 420 represent regions of the plunger 404 that have a greater radius than the transit sealing region 422. As shown in FIGS. 4a and 4b, the proximal transit seal lip 421 and the distal seal lip 420 are adjacent to the transit sealing region 422 in an axial direction. The proximal transit lip seal 421 is closer to the proximal end of the valve assembly 300 than the transit sealing region 422. The distal transit lip seal 420 is closer to the distal end of the valve assembly 300 than the transit sealing region 422.

The valve body 402 includes a rib 423, which extends radially inwards to define the primary opening 414. As shown in FIG. 4a, when the plunger 404 is in the transit seal position, the rib 423 of the valve body 402 is located between (in an axial direction) the proximal transit seal lip 421 and the distal transit seal lip 420 of the plunger 404, such that it abuts the transit sealing region 422 of the plunger 404. In this way, the transit sealing region 422 can be considered as a circumferential groove around the plunger 404, that is in contact with the valve body 402 in order to occlude the primary opening 414 when the valve assembly 300 is in the transit seal position. In another example, the valve body 402 may not have a rib 423 but instead may have a tapered surface that engages with the plunger 404 to selectively occlude the primary opening 414.

The valve body 402 mechanically retains the plunger 404 in the transit seal position. The proximal transit seal lip 421 provides a detent that resists movement of the distal end of the plunger 404 towards the distal end of the valve body 402. The distal transit seal lip 420 provides a detent that resists movement of the distal end of the plunger 404 towards the proximal end of the valve body 402. As will be discussed in more detail below, the distal transit seal lip 420 is designed such that it can deform when a sufficient axial external force is applied to the actuation portion 424 of the plunger 404 such that the distal transit lip seal 420 can pass through the primary opening 414 and thereby create a liquid flow path through the primary opening 414.

In this example the spring portion 419 of the plunger 404 is relatively uncompressed when the plunger 404 is in the transit seal position. Optionally, the dimensions of the plunger 404 and the valve body 402 can be designed such that the spring portion 419 of the plunger 404 is slightly under compression when the plunger 404 is in the transit seal position. In this way, the spring portion 419 can apply a bias force to the secondary seal portion 417 of the plunger 404 in order to bias the secondary seal portion 417 against the valve body 402 and thereby occlude the secondary opening 415 in the valve body 402. As indicated above, maintaining the spring portion 419 in a relatively uncompressed state (even with only a small amount of compression) during transit can extend the lifetime of the valve assembly 400.

In the example of FIGS. 4a to 4e, the spring portion 419 of the plunger 404 is implemented as a plurality of axially extending flexible legs, which extend between the primary seal portion 416 of the plunger 404 and the secondary seal portion 417 of the plunger 404. Although it will be appreciated that the spring portion 419 could be implemented differently and still achieve the desired biasing force.

Turning now to FIG. 4b, the plunger 404 is shown in the lineside-attached position. In FIG. 4b, the primary seal portion 416 of the plunger 404 is spaced apart from the valve body 402 such that fluid can flow through the primary opening 414. However, the secondary seal portion 417 of the plunger 404 is in contact with the valve body 402 in order to occlude the secondary opening 415. Therefore, the valve assembly 400 is still closed because there is not an open flow path through both the primary opening 414 and the secondary opening 415.

The plunger 404 is maintained in the lineside-attached position by an external force, which is shown schematically in FIG. 4b as an arrow with reference number 425. This external force 425 is applied to the plunger 404 by a lineside connector (not shown) that is connected to the valve assembly 400, for instance in the same way as described above with reference to FIG. 2. The lineside connector exerts a force on the actuation portion 424 of the plunger 404 as it is attached to the valve body 402. The actuation portion 424 is mechanically connected to the primary seal portion 416 of the plunger such that the force applied to the actuation portion 424 is transferred to an axial force on the primary seal portion 416. This axial force on the primary seal portion 416 causes the distal transit seal lip 420 (and/or the rib 423 that defines the primary opening 414) to deform such that the distal transit lip seal 420 can pass through the primary opening 414. Once the distal transit lip seal 420 has passed through the primary opening 414, the primary seal portion 416 of the plunger 404 is spaced apart from the valve body 402 such that fluid can flow through the primary opening 414.

In this example, when the primary seal portion 416 of the plunger 404 is spaced apart from the valve body one or more apertures 418 in the plunger 404 provide part of the fluid flow path through the primary opening 414 and also through the plunger 404.

Application of the external force 425, and the movement of the primary seal portion 416, causes the spring portion 419 of the plunger 404 to be compressed. This is because the secondary seal portion 417 of the plunger is prevented from moving in an axial direction towards the proximal end of the valve body 402 due to the geometry of the valve body 402.

More particularly the valve body 402 includes a shoulder 426, which is a radially extending surface of the valve body 402 around the secondary opening 415. The shoulder 426 faces towards the distal end of the valve body 402. In this example, the shoulder 426 is provided as a distally-facing surface of a ring member 427. The ring member 427 is spaced apart from the primary opening 414 in the valve body 402 in an axial direction. In this example, the ring member 427 is spaced apart from the primary opening 414 by a cylindrical section 428 of the valve body 402, and the shoulder 426 extends radially inwardly (towards the axis) from the cylindrical section 428. The cylindrical section 428 may have a circular cross-section or may have a non-circular cross-section. Similarly the secondary opening 415 and/or the ring member 427 may or may not be circular.

In a yet further alternative, the valve body 402 may not have a shoulder 426. Instead, the cylindrical section 428 may taper inwards (as the cylindrical section 428 extends towards the proximal end of the valve body) such that the secondary seal portion 417 of the plunger 404 can occlude the second opening 415 under the influence of the external force 425. The secondary seal portion 417 can be spaced apart from the second opening 415 (thereby providing a liquid flow path through the second opening 415) when the force provided by the pressure differential causes the secondary seal portion 417 to move towards the distal end of the valve body, at which point the cylindrical section 428 will have a larger internal radius and liquid can flow around the outside of the secondary seal portion 417.

Returning to the effects of the external force 425, the compression of the spring portion 419 of the plunger 404 applies an axial force to the secondary seal portion 417. The spring portion 419 provides a mechanical link between the primary seal portion 416 of the plunger 404 and the secondary seal portion 417 of the plunger 404. The axial force applied to the secondary seal portion 417 of the plunger 404 by the spring portion 419 therefore urges the second seal portion 417 into contact with the valve body 402 in order to occlude the secondary opening 415. More specifically for the example of FIG. 4b, the axial force 425 urges a secondary sealing surface 429 of the secondary seal portion 417 intro contact with the shoulder 426 of the ring member 427 of the valve body 402.

Therefore, when the lineside connector is connected to the valve assembly 400, a fluid flow path through the primary opening 414 is opened up (because the plunger 404 has been unseated from its transit position) but there is no fluid flow path through the secondary opening 415. In this way, the valve assembly 400 is still closed because no fluid can be extracted from the bag that is attached to the valve assembly 400.

In the example of FIGS. 4a to 4e, the plunger 404 also includes a radially-outwards extending, circumferential, primary-opening-retention-lip 430, which is located axially between the primary seal portion 416 and the distal end of the plunger 404. As the external force is applied to the actuation portion 424 of the plunger 404, the primary-opening-retention-lip 430 is moved towards the proximal end of the valve body 402. As can be seen in FIG. 4b, when the lineside connector is fully connected to the valve assembly 400, the primary-opening-retention-lip 430 has passed through the primary opening 414. In a similar way to that discussed above, the axial force on the actuation portion 424 causes the primary-opening-retention-lip 430 (and/or the rib 423 that defines the primary opening 414) to deform such that the primary-opening-retention-lip 430 passes through the primary opening 414. This primary-opening-retention-lip 430 can provide the optional functionality of retaining the primary seal portion 416 of the plunger 404 in a predefined spaced apart relationship from the valve body 402 even when the lineside connector is removed, as will be described below with reference to FIG. 4e.

Turning now to FIG. 4c, the plunger 404 is shown in the fluid flow position (with liquid flow shown in dashed lines). The lineside connector is still connected to the valve assembly 400 such that the external force is applied to the actuation portion 424 of the plunger 404 and the primary seal portion 416 of the plunger 404 is spaced apart from the valve body 402 such that liquid can flow through the primary opening 414. In addition, the pressure of fluid in the pipework that is connected to the valve assembly 400 is reduced such that it is lower than the pressure of fluid in the bag. For instance, a vacuum can be applied to the lineside connector to cause a pressure differential across the valve assembly 400. This change in pressure is provided in response to a request to extract liquid from the bag to which the valve assembly 400 is connected.

The plunger 404 and the valve body 402 are designed such that when the plunger 404 is in the lineside-attached position (as shown in FIG. 4*b*) the spring portion 419 of the plunger 404 applies an axial biasing force to the secondary seal portion 417 towards the proximal end of the valve body. This axial biasing force can be overcome by applying the pressure differential across the valve assembly 400. That is, the net force on the secondary seal portion 417 of the plunger 404 when the lineside is connected and a pressure differential is applied causes the secondary sealing surface 429 of the plunger 404 to move away from the shoulder 426 of the valve body 402, thereby enabling liquid to flow through the second opening 415.

In this way, the plunger 404 is maintained in the fluid flow position by: an external force (in this example the external force is applied against an axial spring bias force that is provided by the spring portion 419 of the plunger 404); and a force caused by a pressure differential across the valve assembly 400 (the force caused by the pressure differential also acts against the axial spring bias force causing further axial compression of the plunger 404).

Turning now to FIG. 4*d*, the plunger 404 is in the reseal position because the pressure differential across the valve assembly 400 has been removed. The plunger 404 is put in this position when sufficient liquid has been extracted from the bag and fluid flow through the valve assembly 400 is no longer required. In this example, the reseal position is the same as the lineside-attached position (of FIG. 4*b*) in that the primary seal portion 416 of the plunger 404 is spaced apart from the valve body 402 such that fluid can flow through the primary opening 414; the secondary seal portion 417 of the plunger 404 is in contact with the valve body 402 in order to occlude the secondary opening 415; and the plunger 404 is maintained in the reseal/lineside-attached position by the external force 425.

In many applications, fluid will only be drawn through the valve assembly 400 intermittently and for short periods of time. In examples where the bag contains a concentrated syrup for soft drinks, a typical use case would be for syrup to be drawn 20 ml at a time over the duration of perhaps a second. Furthermore, there can be a relatively long time between successive dispenses of liquid—for instance when the establishment is closed overnight or on a weekend. In which case, the valve assembly of FIG. 4 is particularly advantageous because the spring portion 419 is under maximum compression (when the plunger 404 is in the fluid flow position of FIG. 4*c*) for relatively short periods of time. This is advantageous because it can extend the lifetime of the valve assembly 400.

In this way, the secondary seal (defined by the secondary seal portion 417 and the secondary opening 415) is one-way and is by default closed. When the secondary seal is subjected to a vacuum (with the lineside attached) it opens to allow product flow, but is closed on removal of the vacuum. Furthermore, the design of FIG. 4 is advantageous in that the secondary seal (which is closed when the plunger is in the lineside-attached position) is further from the (potentially relatively dirty) pipework that is attached to the valve assembly 400, and therefore isolates more of the liquid in the bag from contamination by the pipework.

Turning now to FIG. 4*e*, the plunger 404 is shown in the disconnected position. In this configuration the lineside connecter has been disconnected from the valve assembly 400 such that the external force on the actuation portion 424 of the plunger has been removed.

In the disconnected position, the secondary seal portion 417 of the plunger 404 is in contact with the valve body 402 in order to occlude the secondary opening 415. The spring portion 419 of the plunger 404 applies a biasing force to the secondary seal portion 417 to urge the secondary sealing surface 429 of the plunger 404 against the shoulder 426 of the valve body in the same way that is described above with reference to the lineside-attached position of the plunger 404 that is shown in FIG. 4*b*. In this way, the plunger 404 is retained in the disconnected position by an axial spring bias force provided by the plunger 404.

In many applications a lineside connector is very rarely disconnected from and then reconnected to a valve assembly. This is because the lineside connector is usually only disconnected from a valve assembly when the associated bag is empty of liquid. In which case, it can be perfectly adequate for there to be a fluid flow path through the primary opening 414 (as shown in FIG. 4*e*) after the lineside is connected as long as there is no fluid flow path through the secondary opening 415 (again, as shown in FIG. 4*e*). In this example there is a fluid flow path through the primary opening 414 when the plunger 404 is in the disconnected position because the spring force of the spring portion 419 of the plunger 404 is insufficient to overcome the mechanical resistance that is provided by the rib 423 of the valve body 402 acting on the primary-opening-retention-lip 430.

However, in other examples the valve assembly 400 can be designed such that the plunger returns to the transit seal position after a lineside connector has been disconnected from the valve assembly. That is, the plunger 404 can be in the same position in the disconnected position as it is when it is in the transit seal position of FIG. 4*a*. It will be appreciated that in order to provide this functionality, one or more of the following parameters can be designed accordingly: the spring force of the spring portion 419 of the plunger 404, the dimensions of the rib 423 that defines the primary opening 414, the dimensions of the distal transit seal lip 420, and the dimensions of the primary-opening-retention-lip 430.

The valve assembly of FIGS. 4*a* to 4*e* is well-suited for implementation as a mono-material system. This is because the spring portion 419 of the plunger 404 is not required to be fully compressed for an extended period of time. Furthermore, the compression set that is observed for polyethylene (one of the example materials that can be used to implement the plunger 404 while retaining the recyclability of the valve assembly) is also well-suited for the valve assembly of FIGS. 4*a* to 4*e*.

Beneficially, the primary seal (that is closed in the transit position-see FIG. 4*a*) can rely on the initial assembly and an interference fit to create the primary seal. Optionally, the spring portion 419 of the plunger 404 can provide a limited secondary seal in the transit position. Once the lineside is engaged, the plunger is moved to the lineside-attached position (FIG. 4*b*) such that the plunger is mechanically moved to a second position, in which all the sealing is performed due to the axial bias force that is provided by the spring portion 419. Advantageously, the secondary seal is only opened for very short periods (and by a small amount) to put the plunger 404 in the fluid flow position when fluid is required to be dispensed, and so the spring portion 419 is operating in the most benign environment for a plastic spring.

The invention claimed is:

1. A valve assembly comprising a valve body and a mono-material plunger, wherein:
    the valve body has a primary opening and a secondary opening, wherein the primary opening and the secondary opening are axially spaced apart;
    the plunger comprises:
        a primary seal portion configured to selectively occlude the primary opening; and
        a secondary seal portion configured to selectively occlude the secondary opening; and
    wherein the plunger comprises the following operational positions with respect to the valve body:
    a transit seal position in which:
        the primary seal portion of the plunger is in contact with the valve body in order to occlude the primary opening;
    and a fluid flow position in which:
        the primary seal portion of the plunger is spaced apart from the valve body such that fluid can flow through the primary opening;
        the secondary seal portion of the plunger is spaced apart from the valve body such that fluid can flow through the secondary opening; and
        the plunger is maintained in the fluid flow position by an external force and a force caused by a pressure differential across the valve assembly.

2. The valve assembly of claim 1, wherein, when the plunger is in the transit seal position:
    the plunger is mechanically retained in the transit position such that a spring portion of the plunger is relatively uncompressed.

3. The valve assembly of claim 1, wherein, when the plunger is in the transit seal position:
    the secondary seal portion of the plunger is in contact with the valve body in order to occlude the secondary opening.

4. The valve assembly of claim 1, wherein:
    the valve body has a distal end and a proximal end; and
    the primary opening is closer to the distal end of the valve body than the secondary opening.

5. A drinks container comprising the valve assembly of claim 1.

6. The valve assembly of claim 1, wherein the plunger comprises the following further operational position with respect to the valve body:
    a lineside-attached position in which:
        the primary seal portion of the plunger is spaced apart from the valve body such that fluid can flow through the primary opening;
        the secondary seal portion of the plunger is in contact with the valve body in order to occlude the secondary opening; and
        the plunger is maintained in the lineside-attached position by an external force.

7. The valve assembly of claim 6, wherein the plunger is maintained in the lineside-attached position by the external force that is applied against an axial spring bias force.

8. The valve assembly of claim 7, wherein the plunger comprises a spring portion that is configured to provide the axial spring bias force.

9. The valve assembly of claim 1, wherein the plunger comprises the following further operational position with respect to the valve body:
    a disconnected position in which:
        the secondary seal portion of the plunger is in contact with the valve body in order to occlude the secondary opening; and
        the plunger is retained in the disconnected position by a spring portion of the plunger.

10. The valve assembly of claim 9, wherein the plunger is configured to be in the disconnected position following removal of the external force.

11. The valve assembly of claim 9, wherein, when the plunger is in the disconnected position:
    the primary seal portion of the plunger is in contact with the valve body in order to occlude the primary opening.

12. The valve assembly of claim 1, wherein, in the fluid flow position:
    the primary seal portion of the plunger is maintained spaced apart from the valve body by the external force; and
    the secondary seal portion of the plunger is maintained spaced apart from the valve body by the pressure differential across the valve assembly.

13. The valve assembly of claim 12, wherein, in the fluid flow position:
    the primary seal portion of the plunger is maintained spaced apart from the valve body by the external force that is applied against an axial spring bias force.

14. The valve assembly of claim 13, wherein the plunger comprises a spring portion that is configured to provide the axial spring bias force.

15. The valve assembly of claim 13, wherein, in the fluid flow position:
    the secondary seal portion of the plunger is maintained spaced apart from the valve body by the pressure differential across the valve assembly and also against the axial spring bias force.

* * * * *